United States Patent [19]

Kato

[11] 4,044,639
[45] Aug. 30, 1977

[54] SYSTEM FOR CUTTING PIECES FROM A TRAVELING STRIP OF SHEET MATERIAL

[75] Inventor: Tetsuji Kato, Otake, Japan

[73] Assignee: Mitsubishi Rayon Co., Ltd., Tokyo, Japan

[21] Appl. No.: 586,367

[22] Filed: June 12, 1975

Related U.S. Application Data

[62] Division of Ser. No. 533,182, Dec. 16, 1974, which is a division of Ser. No. 434,065, Jan. 17, 1974, Pat. No. 3,892,153.

[30] Foreign Application Priority Data

| Jan. 18, 1973 | Japan | 48-8169 |
| Jan. 18, 1973 | Japan | 48-8170 |

[51] Int. Cl. ............................ B26D 3/08; B26D 5/00
[52] U.S. Cl. ............................................. 83/7; 83/61; 83/371; 83/71
[58] Field of Search .................... 83/61, 7, 11, 12, 71, 83/371, 13

[56] References Cited

U.S. PATENT DOCUMENTS

| 3,205,740 | 9/1965 | Groves et al. | 83/71 |
| 3,244,337 | 4/1966 | Curtze et al. | 83/7 X |
| 3,246,550 | 4/1966 | Galey et al. | 83/71 X |
| 3,352,015 | 11/1967 | Galabert et al. | 83/7 X |
| 3,439,849 | 4/1969 | Matsuzaki et al. | 83/11 |
| 3,552,252 | 1/1971 | Maxey et al. | 83/371 X |

Primary Examiner—Willie G. Abercrombie
Attorney, Agent, or Firm—Kenyon & Kenyon

[57] ABSTRACT

Continuously cast plastic strip has interspaced marks or defects with lengths of unmarked usable strip therebetween. To obtain a maximum possible yield of sheets from such strip, the lengths of the portions between the marks or defects are measured and cut into sheets of two or more different lengths, the cutting being such as to produce the maximum yield of sheets of either or all lengths, singly or in combination, which can be obtained from the length cut. This procedure reduces the loss or waste due to the marks or defects, to a minimum. A special system is provided for this practice and for cutting out the marks or defects between the unmarked strip portions free from defects, with a minimum of loss or waste. Other features are involved.

1 Claim, 13 Drawing Figures

SYSTEM FOR CUTTING PIECES FROM A TRAVELING STRIP OF SHEET MATERIAL

This is a division of application Ser. No. 533,182, filed Dec. 16, 1974, which in turn is a division of application Ser. No. 434,065, filed Jan. 17, 1974 now U.S. Pat. No. 3,892,153.

BACKGROUND OF THE INVENTION

The present invention relates generally to a system for cutting pieces having selected diverse lengths from a traveling strip of sheet material, such as plastic sheet, glass sheet, and laminated plywood sheet, and more particularly relates to a cutting system adapted for use in cutting a belt-like plastic sheet continuously cast between opposing traveling spans of long endless metal loops.

In various industries sheets which must be of different lengths to meet specifications, are obtained by first producing the sheet material such as plastic, glass and the like in strip form and then transversely severing the strip at intervals to provide the required sheets. Also, it is quite usual that the production of the sheet material and the severing of the required sheets are carried out in directly connected continuous processes in order to effectively use a limited factory space. That is, the severing of the required sheets is carried out without stopping the traveling of the sheet material continuously fed from the sheet material production process.

For this purpose, it has been customary to use an apparatus comprising a strip cutter and means for reciprocating this cutter through a cutting cycle composed of a cutting stroke and a return stroke. The cutting stroke moves the cutter diagonally across the traveling strip at an angle and speed which causes the cutter to sever the strip at right angles, and the return stroke returns the cutter to a position of readiness for a succeeding cutting cycle.

In the case of glass, the cutter may be a diamond, while, for example, rotary saws may be used as the cutter for plastics. Other examples would be a pressurized water jet or a laser ray, used as the cutter for both glass and plastic.

In one form of such an apparatus, the cutter is mounted on a carriage running on a track positioned diagonally and transversely over the traveling strip. The carriage is driven, for example, by sprocket chains which are driven by sprocket wheels, or by being in screw-threaded engagement with a threaded drive shaft extending along the length of the track. The design is such that the cutter carriage is driven through a cutting stroke, at a speed related to the angularity of the track, so that the cutter cuts the traveling strip at right angles. The cutter carriage drive is then reversed to effect a return stroke of the carriage, during which the cutter moves to an inoperative position free from the strip in readiness for a succeeding cutting stroke. In this fashion, the cutter is reciprocated through a cycle of the two strokes and the time for completion of this cycle, as related to the length of strip passing during this time, determines the minimum length of piece that can be severed from the traveling strip.

During both the cutting and return strokes the strip continues to travel, the speed of the cutting stroke being fixed as required by the angularity of the cutting stroke, and the strip traveling speed, and the speed of the return stroke being limited by practical mechanical design considerations.

In another type, the cutter, formed by a set of upper and lower rotary saws, is carried by a carriage which reciprocates at right angles to the traveling strip but with this carriage mounted on a frame to reciprocate parallel with respect to the traveling strip; with the frame moving synchronously with the strip while the cutter carriage moves transversely with respect to the strip, and with proper timing of the motions, the strip is severed at right angles. In this case the cutter carriage is ordinarily reciprocated transversely with respect to the frame by being in screw-threaded engagement with a threaded drive shaft. In any event, the return stroke of the cutter carriage cannot be made extremely fast. Therefore, with this type of apparatus, also, the minimum length of a piece that can be severed from a traveling strip, is limited.

As the production rate of each commercial manufacturing process has increased, the traveling speed of such strip material has also increased, making it necessary to sever from the strip, pieces which are shorter than the minimum length that can be cut by apparatus of the type described.

One example is in the production of a strip of cast plastic leaving a continuous casting machine of the type using two stainless steel endless belts defining a continuously traveling casting space into one end of which a liquid which hardens with temperature, is cast to produce the continuously traveling strip from its other end and requiring severing into commercially desirable lengths. One of these belts is usually longer than the other, and in each instance the endless stainless steel belt is formed by welding together the ends of a suitable length of stainless steel strip. The weld lines may mark the cast strip surfaces and such markings occur at random on the opposite surfaces of the strip. The marked portions must be removed by cutting and in the interests of manufacturing cost reduction, the marked pieces should be cut as short as possible, as they are mostly discarded as waste or used as reclaiming material.

In this instance, the type of apparatus using a set of upper and lower rotary saws, is more appropriate, but this apparatus cannot make repeated cuts rapidly enough to cut out the desired minimum lengths from the strip to remove the imperfect portions with a minimum of waste.

Also, with such continuously traveling cast plastic strip, which is of infinite length because of the continuous production involved, it may be desirable to produce two or more different lengths of commercially acceptable sheets from between the pieces which must be cut out and wasted because of being marked by the belt welds. The plastic strip may unfortunately require removal of imperfections or manufacturing defects other than the unavoidable belt weld marks. If the traveling strip could be cut rapidly enough, the imperfect portions could be removed and these could be of relatively short lengths, while the two or more different lengths could be severed from each usable portion between neighboring imperfect portions in a manner determined to produce an appropriate number of commercially acceptable sheets of the two or more different lengths while minimizing the loss which is defined as the remaining sheet portion resulting from severing the appropriate number of sheets of the two or more different lengths from the usable sheet portions. In this connection, the yield of sheets usable as first-grade products which can be obtained from the strip portions between the defects, as related to the amount of the cast plastic strip material which must be considered waste, has, of course, a direct relationship on the overall costs of manufacturing the plastic sheets in different commercial lengths, or lengths specified by customers of the sheet manufacturer.

Therefore, a principal object of the present invention is to provide a system for cutting or severing such strip sheet material, particularly, but not exclusively, continuously cast plastic strip sheet material, into sheets of commercially required lengths so as to obtain a better yield of sheets from the strip sheet material of infinite length containing the randomly interspaced defects.

Another object of the present invention is to provide a system capable of meeting the requirements of rapid cutting of the traveling strip to thereby remove relatively short lengths of the traveling strip which contain the imperfect portions.

SUMMARY OF THE INVENTION

In accordance with the present invention, a system for cutting pieces from a traveling strip of sheet material is provided, in which when two or more stocks of sheets of relatively longer and shorter lengths are to be obtained, the length of each usable strip sheet material portion is measured, for example, by measuring the portions of strip approaching a strip severing or cutting means, in the case of a continuously traveling strip. In the system this can be done by a measuring wheel running on the continuously traveling strip and feeding the results to a computer.

Knowing the specified lengths required for the stocks of sheets of differing lengths, a combination ratio of sheet piece numbers of the different lengths for obtaining an entire combined length which amounts more closely to but is smaller than the measured, or otherwise determined, length value of each usable portion of the strip sheet material, is then determined, thereby to minimize loss produced when the sheet pieces of the different lengths are subsequently severed from the usable strip portion of the sheet material in the determined combination ratio The above requires that at least two stocks of sheets of relatively longer and shorter lengths are to be obtained by cutting the strip. In the system computerized equipment is used in which the various sheet length values are stored for comparison with the usable strip sheet material portion values successively measured. The computerized equipment also stores the above determined combination ratio of sheet piece numbers of at least two different lengths for cutting from the usable strip sheet material portions. This stored combination ratio of numbers of sheets is then translated into automatic control of strip severing or cutting means which then automatically severs the sheet pieces of at least two different lengths from each of the portions measured, in that combination ratio.

Further, according to the present invention, the rapid cutting of the traveling strip to remove relatively short lengths containing the imperfect portions, is attained by using a strip severing or cutting means which includes a first severing apparatus of the type described and a second apparatus which may be substantially the same as the first and positioned in series with and behind the first with respect to the traveling direction of the strip. Also, the second apparatus is positioned behind the first one so as to interspace the respective cutters of the two, in the longitudinal direction of the traveling strip, at a distance less than the minimum length the first apparatus could sever by going through two cycles of operation times as closely together as possible while allowing time for the cutter reciprocating means to go through the cutting stroke and the return stroke prior to going through a second cycle.

Furthermore, the cutter reciprocating means of each of the two apparatuses is operable through its cycle independently with respect to the other. Therefore, the first apparatus can make a cut and when the initially cut portion reaches the second apparatus, it can also start through its cycle, thus permitting extremely short pieces to be severed from the strip, which is of particular advantage in removing short imperfections.

Preferably, when required, means are provided for automatically operating in sequence, the cutter reciprocating means of the two apparatuses through their cycles, with the cutter reciprocating means of the second apparatus starting its cycle while the cutter reciprocating means of the first apparatus is still going through its cycle. Also, with this system, another preferably feature is the provision of means responsive to the approach of a predetermined length of the strip to the system of the first and second apparatuses, that length being less than the minimum length either could sever, for starting the cycle of the cutter reciprocating means of the first of the two apparatuses and thereafter, starting the cycle of the cutter reciprocating means of the second apparatus, when severing from the strip a piece having that predetermined length. For example, the predetermined length may represent an inperfection and may be of varying extent lengthwise with respect to the strip, the extremes of this length being marked by an inspector and the markings used to automatically initiate the sequential operation of the two apparatuses, with the start of each cycle timed to sever the opposite end, front and back, of the piece containing the imperfection.

BRIEF DESCRIPTION OF THE DRAWINGS

Features of the present invention will be more apparent from the ensuing description with reference to the accompanying drawings wherein.

DETAILED DESCRIPTION OF THE INVENTION

Figure 1:
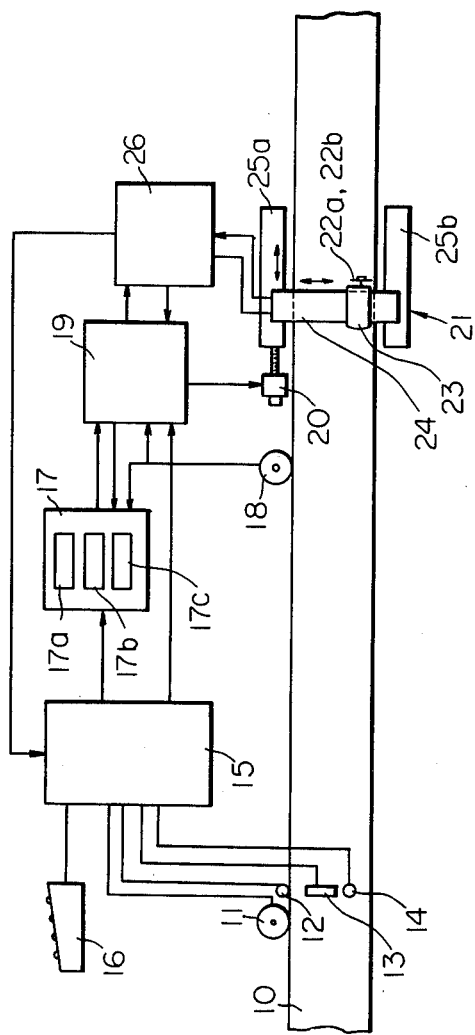
FIG. 1 is a schematic block diagram showing a typical system for cutting pieces from a traveling strip of sheet material according to the present invention.
Figure 2A:
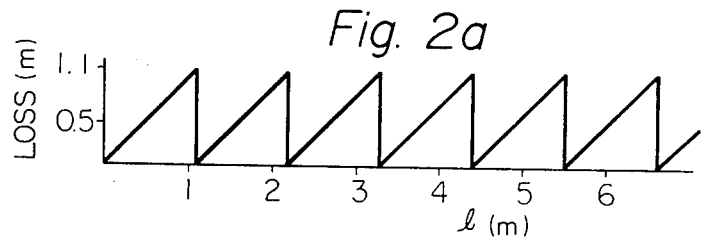
FIGS. 2a through 2d are graphs illustrating the computing principles carried out by the computer of the system of FIG. 1.
Figure 2B:
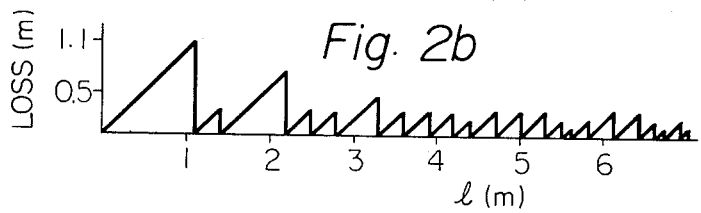
Figure 2C:
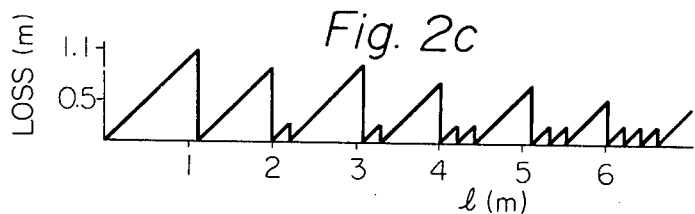
Figure 2D:
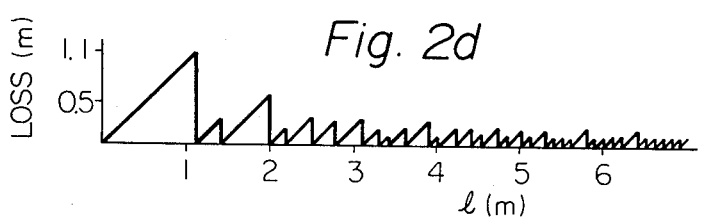

Referring to FIG. 1, reference numeral 10 is a traveling strip of sheet material which is continuously fed from a sheet production machine such as is exemplified hereinafter. Provided for the traveling strip 10 of the sheet material, are a pickup 11 for emitting an electric signal in response to each predeterminable traveling length of the strip 10, a pickup 12 for detecting each reference point of the strip, pickups 13 arranged in the tranverse directon of the strip 10 of the sheet material, for detecting appearance defects, and pickups 14 for detecting thickness imperfections of the sheet material. Each of pickups 11 through 14 may be of an electric, an electronic, or a photo-electric type. The respective outputs of the pickups 11 through 14 are transferred to an electronic computer 15. In addition, information such as specified lengths of sheet pieces to be cut from the strip 10 of the sheet material, the number of sheet pieces required to be cut from the strip 10 of the sheet material and the like, are also supplied to the computer 15 from an operating panel 16.

A sheet severing apparatus 21 is arranged across and over the traveling strip 10 of the sheet material. The apparatus 21 comprises a set of upper and lower rotary saws 22a, 22b mounted on the shafts of motors (not shown) carried by a carriage 23 transversely movable on a frame 24 which is mounted and guided on stationary beds 25a, 25b so as to reciprocate in directions parallel to the strip's traveling direction. When the strip 10 is tranversely severed by saws 22a, 22b, movement of frame 24 is synchronized with and is in the same direction as the traveling of the strip. This synchronization is attained in a manner such that a pickup 18, which is the same type as pickup 11, supplied electric pulse signals to an electrohydraulic pulse motor 20, which may be of a type shown in the U.S. Pat. No. 3,079,899, Inaba et al, dated Mar. 5, 1963, through a pulse motor controller 19. As a result, electrohydraulic pulse motor 20 drives frame 24 in the same direction as the strip's traveling direction, through a screw -threaded engagement employing a precision ball-screw mechanism.

The ordinary operation of this system is explained as follows.

A presetting counter controller 17 is provided with three presetting counters 17a, 17b and 17c, in each of which a number representing a length of piece to be cut from the traveling strip 10 of the sheet material can be preliminarily set. These three presetting counters 17a, 17b and 17c continuously and simultaneously count electric pulses coming from pickup 18. Each counter 17a, 17b or 17c is reset to zero when the number of counted pulses reaches a number preliminarily set in each counter, and then each counter subsequently counting the electric pulses coming from pickup 18. Further, in the system of FIG. 1, a connection is provided between computer 15 and presetting counter controller 17 so that computer 15 can select one of three counters 17a, 17b and 17c. Thus, when the selected counter counts its preset number of the above-mentioned electric pulses from pickup 18, a signal is supplied from the controller 17 to pulse motor controller 19 for starting electrohydraulic pulse motor 20 and simultaneously, the selected counter 17a, 17b or 17c is reset. In the presetting counter controller 17, interconnections are provided among the three presetting counters 17a through 17c so that when the selected counter completes its counting of the preset number of electric pulses and is reset to zero, the remaining two counters simultaneously interrupt their counting and are immediately reset to zero.

When pulse motor controller 19 receives the starting signal, it supplies electric pulses coming from pickup 18 to electrohydraulic motor 20. As a result, frame 24 of the serving apparatus 21 starts to move by the drive of the motor 20 in the same direction as and in synchronization with the traveling speed of the strip 10. A controller 26 starts to control the severing operation of the severing apparatus 21 when the controller 26 receives a signal indicating the start of electrohydraulic pulse motor 20 from the pulse motor controller 19. That is, as soon as frame 24 begins to move, the controller 26 controls a sequence of the operations of the severing apparatus 21, such as clamping the traveling strip 10 of the sheet material (described hereinafter); traversing severing saws 22a, 22b across the strip 10 and releasing the above clamping of the strip 10 which retracting saws 22a, 22b apart from each other to positions where no interference is provided between saws 22a, 22b and traveling strip 10, after completion of the traversing of severing saws 22a, 22b. The controller 26 provides a feedback signal to pulse motor controller 19 when the traversing of severing saws 22a, 22b is completed. Then, based upon this feedback signal, electrohydraulic motor 20 is temperarily stopped and subsequently, the motor 20 is restarted in its reverse operation thereby returning frame 24 to the initial position. While frame 24 is returning to the initial position, the carriage 23 carrying severing saws 22a, 22b also returns to its initial position. Consequently, one cycle of the cutting motion of the severing apparatus 21 is, therefore, completed and the severing apparatus 21 is ready for the subsequent cutting cycle.

When one cycle of the severing motion by the severing apparatus 21 is completed, a feedback signal is emitted from controller 26 to both pulse motor controller 19 and computer 15. Then, computer 15 supplies to the presetting counter controller 17, a counter selection signal by which one of the counters 17a through 17c, capable of representing the length of the sheet piece to be subsequently cut from the traveling strip 10 of the sheet material, is selected.

The operation of the system in the case where defects or imperfections are detected by pickups 13 and 14 will now be explained.

When the output of pickups 13 or 14, which respectively indicate defect and thickness imperfections in the strip's appearance, is imparted to computer 15, the position of a defect or imperfection on the traveling strip 10 is confirmed through comparison of the output from pickups 13 or 14 with the output from pickup 11.

In the case where there is no defect or no thickness imperfection between the confirmed defect or imperfection position and the strip portion approaching the severing apparatus 21, the computer 15 carries out a computation for determining as to what combination ratio of portion is of sheets of three kinds of specified differing lengths preset in presetting counters 17a through 17c, can obtain an entire combined length which amounts closest to but is smaller than the usable length of the strip between the above confirmed defect or thickness imperfection and the strip portion approaching the severing apparatus 21, or the immediately previously severed strip portion, whereby to minimize loss produced when the sheet pieces are severed from the usable strip sheet material portion in the determined combination ratio of numbers of sheets. The resulting combination ratio for the usable strip portion is then stored in computer 15.

Subsequently, on the basis of this stored combination ratio, computer 15 supplies to presetting counter controller 17, sequential counter selection signals for indicating which of the three presetting counters 17a through 17c which presets the number representing the length to be cut from the traveling strip 10, should be selected for each of said sequential counter selection signals. As a result, in response to said sequential counter selection signals, severing is carried out to obtain different lengths of sheet pieces in the computed combination ratio of numbers of sheets.

In the case where there is a defect or imperfection between the above-mentioned confirmed defect or thickness imperfection position and the strip portion approaching the severing apparatus 21, computer 15 also carried out the same computation as described above with respect to the usable strip portion between the two defects or thickness imperfection positions and computer 15 stores the computed result. Then, based upon this computed result, computer 15 supplies counter selected signals to presetting counter controller 17 whereby the severing of the usable strip portion is carried out.

In the case where there is a possibility that the defect or thickness imperfection portion appearing in the traveling strip continues longer than any of the lengths of the strip preset in the counters 17a through 17c, it is quite practical that two of the counters 17a through 17c are used for presetting the lengths of the sheet pieces going to commercial products while the remaining single counter is used for presetting the number representing the appropriate length into which the long defect or thickness imperfection portion is severed. The appropriate length of the severed defect or thickness imperfection sheet pieces is discarded as waste or used for reclaiming material.

Computer 15 can also directly supply a signal to pulse motor controller 19 for starting the severing of the strip 10. This fact enables severing apparatus 21 to sever the strip 10 immediately after the defect or imperfection position confirmed by computer 15 passes under severing apparatus 21. As a result, from the usable sheet portion subsequent to the defect or imperfection position, first-grade sheet pieces can be severed with a better yield.

When the signal is directly supplied from computer 15 to pulse motor controller 19, all counters 17a through 17c are reset to zero.

Pickup 12 is arranged to as to detect the passing of the sheet positions having the markings formed by specified weld lines of the endless belts of the sheet production machine. This detection of the passing of the markings is also transferred to computer 15 and as a result, based upon the positions of the markings, the positions of the other defective portions of the traveling strip 10, which result from the weld lines of the endless belt other than the specified weld lines and/or defects on the surfaces of the endless belt of the sheet production machine, are preliminarily found by computer 15. The positions of the weld lines of the endless belt other than the specified weld lines and/or the positions of defects on the surfaces of the endless belt, relative to the positions of the specified weld lines, can preliminarily be stored in the computer 15 as input information. Consequently, computer 15 can carry out the aforementioned computation to determine the combination ratio of numbers of sheet in which ratio sheet pieces can be severed from each usable strip portion between two defects so as to minimize loss.

The computation principles carried out by electronic computer 15 to determine the combination ratio of numbers of sheets of two or more different lengths, in which combination ratio sheet pieces can be obtained from each usable portion of the strip between two defects or between a defect and the immediately previous severed end of the strip, are next explained in detail.

To provide a preliminary understanding of the new method, the principle involved is explained below.

Assume that there is available a length of strip sheet material which contains a number of usable portions between interspaced defects and therefore, capable of having first-quality sheets produced therefrom. Assume also that each usable portion of this length is long enough to permit a number of the sheets to be cut from it. In practice, each usable portion is between either two defects in the strip or between the cut end of the strip and one defect. After cutting each usable strip portion into a predetermined number of sheets of two or more different lengths, there must remain a portion of usable material that is too short to provide one more sheet having any one of the specified lengths and this portion must be considered as loss, the entire length of every sheet obtained being the yield. With this understanding, loss is expressed by the following formula where $Ni$ represents the number of sheets and $Ti$ represents the sheet lengths which it is to be assumed are specified to considered as standard lengths:

$$\text{Loss} = l - \sum_i (Ni \times Ti)$$

The new method is based on the principle that $Ni$ may be selected so as to minimize loss when $l$ and $Ti$ are given.

In the FIG. 2 series, which schematically illustrate the above, the abscissa in each of the graphs $a$ to $d$ indicates the strip length $l$ in meters and the ordinate represents loss. Graph 2a shows an example where $i$ in the above equation is selected to be one throughout the length; a single standardized length of sheet is cut from the strip, the sheet length in this instance being 1100 mm. In this case, the loss shows a uniform repetition and the average loss value is half of Ti.

In graph 2b, showing the practice of this new method, different lengths are cut in appropriate combination ratio of sheet numbers from the usable portions of the strip, in this instance, the different specified lengths being 1100 mm and 1400 mm, and graph 1c is the same except that in this instance the specified sheet lengths are 1100 mm and 2000 mm. The two graphs show how loss may be reduced by determining an appropriate combination ratio of numbers of sheets for the two or more different lengths and by cutting from each usable strip portion provided by length $l$, the sheet pieces in the determined combination ratio of numbers of sheets. These graphs show that the larger the value of $l$, the smaller the value of loss, until a practically negligible minimum loss results.

The graph 2d provides an example where three different sheet lengths are involved, the standard or specified sheet lengths in this instance being 1100 mm, 1400 mm, and 2000 mm, loss being reduced to the minimum or practically negligible amount when the value $l$ exceeds 6.4 m as can be seen from the graph. The yield improvement obtained by cutting sheet lengths of a plurality of different standardized or specified lengths from the successive usable portions, depends on the combination used and is independent in practice, of the precise extents of the various lengths, providing the combined lengths are mutually complementary, as is illustrated later herein.

Figure 3:
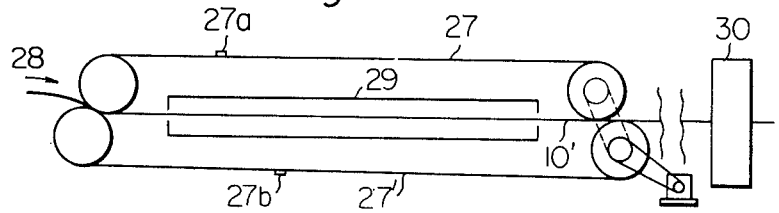
FIG. 3 is a schematic view illustrating a continuous plastic casting machine.

FIG. 3 schematically shows an example of a machine by which continuous cast plastic strip sheet material may be produced. The two endless belt loops 27 and 27' are shown with opposing adjacent spans. Although the scale of the drawing does not permit it to be shown, these two mutually adjacent belt spans are interspaced to provide the casting thickness desired, and the belts are driven so that the two spans travel in the same direction at the same speed. However, the belt loop 27' is longer than the belt loop 27. Each endless belt has at least a weld joint shown on an exaggerated scale at 27a and 27b, and which inevitably mark the cast plastic strip obtained, the unhardened raw material being case between the belts at 28; the hardened strip of plastic sheet material 10' leaving continuously at the other end of the casting space defined between the two mutually adjacent belt spans. This raw material may be a polymerizable material, which is polymerized and hardened while traveling through a heating zone 29 heating the belts. The present invention is, in one aspect, concerned with severing sheets of differing specified lengths from such continuously cast plastic sheet material, coming from the equipment of FIG. 3 continuously as a strip of infinite length.

The strip material leaving the casting machine of FIG. 3 is usually automatically inspected in the inspection process by defect detecting pickups as described with reference to the system of FIG. 1, which detects defects caused by the randomly interspaced belt weld joint marks or by intermixing of foreign materials, and thickness imperfections. The pickups transfer the detected signals to the computer. The length of the usable portions can also be determined by the computer, based upon the signals indicating defects or imperfections which are supplied from the above-mentioned pickups. The different lengths of sheets to be cut into stocks or inventories, or to meet customer orders, are, of course, specified and known. In FIG. 3, a cutter, such as one using saws, of the type capable of making right angular cuts without stopping the traveling strip, is indicated at 30.

When practicing this method, an appropriate combination ratio of numbers of respective sheet pieces having the above respective sheet lengths, of which there must be two or more, are computed, by the computer, so that the entire combined length of the sheet pieces amounts closest to each of the successively measured usable strip portion lengths while minimizing losses as they travel between the casting equipment and the cutting apparatus 30. Then, as each portion reaches the cutting apparatus 30, the latter is actuated, under computer control, to cut only that sheet length from each usable strip portion, in each determined combination ratio of numbers of sheet, the cutting apparatus being, of course, successively operated. This procedure is repeated for each successively produced usable portion of strip sheet material, to obtain the stocks or collections of the sheets of different lengths.

Figure 4:
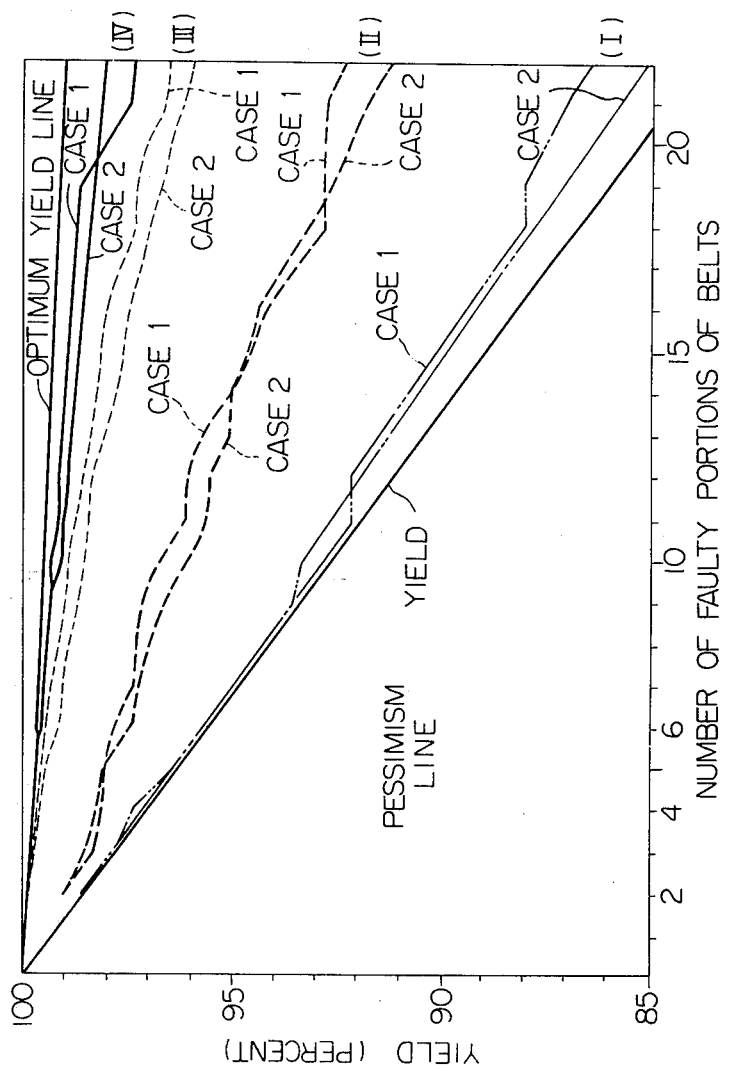
FIG. 4 is a graph showing yield curves representing applications of the computing principles.

FIG. 4 is a graph showing examples of yield curves resulting from the use of the present principles, as simulated by the computer, the abscissa showing the number of faulty strip surface portions such as might be caused by the belt weld joints of the FIG. 3 casting apparatus, and the ordinate showing the product yield when the strip containing the defects is transversely cut at intervals spaced along its longitudinal extent. The conditions assumed are that one of the belt loops in FIG. 3 is 206 m long and the other is 208 m long, each having weld joints, the specified cut sheet lengths selected being 1200 mm, 1500 mm, and 2200 mm. The only faulty portions of the strip considered are those occasioned by the belt weld marks which are assumed to be only 100 mm in length, or less where noted. In connection with these defective portions of belts, a random number is used to randomize the portions in which the defects occur under practical commercial plastic strip sheet material casting conditions using a machine such as shown by FIG. 3, for example.

Each pair of curves shown as Case 1 and Case 2 correspond to two cases wherein the positions of the faulty portions of belts are different. The two curves I at the bottom of the chart correspond to the case where the sheet lengths are all of 1500 mm each. There it can be seen that the yield lowers almost to the line marked "Pessimism Yield Line", this meaning that the full length of one sheet (1500 mm in this instance) must be considered a faulty sheet portion having one strip defect. The yield never lowers below this pessimism yield value because two or more defects may appear within a range or length corresponding to a specified sheet length, in practice. There are portions of the yield curves over which the yield presents almost no variation in spite of an increase of the number of defects as seen in the graph. This is because succeeding defects are too close to preceding defects to give a noticeable influence.

Two curves II in the graph represent an instance when the standardized or specified sheet lengths are also only 1500 mm and are cut, as in the case of the curve I, but the overall length to be cut as waste in this instance, (removed to eliminate the weld joint marks) is half of the length assumed in the case of the curve I. In this way some improvement in yield is obtained.

Contrasting with curves I and II, the two curves III in the graph represent the practice of the principles of the present invention, two different specified sheet lengths of 1500 mm and 2200 mm being cut in an appropriate ratio of sheet numbers, to minimize the resulting loss due to cutting out the weld defects. The yield in this case is sharply improved compared to the other caes where the sheet lengths cut are to obtain only one standard or specified length. Two curves IV emphasize the advantages of the invention, the combination of sheet lengths in this instance being 1200 mm, 1500 mm, and 2200 mm, cut in an appropriate ratio to minimize the waste due to removal of the weld joint defects, the yield approaching, particularly when the defective portions are few in number, close to the "Optimum Yield Line". This term means the yield attainable on the assumption that after the minimum removal of material to the weld joint marks, the entire remaining strip material provides usable sheets of the specified size being cut. This yield can never be exceeded.

As previously pointed out, the improvement of the yield obtainable by the present principle, largely depends on the manner in which the sheet lengths required are cut from the usable portions and this is independent in practice of the specific extents of the longer and shorter lengths of the standard or specified sheets, providing the combinations selected are mutually complementary. This can be understood from the following:

| Defects | Positions of defects | 15 | 15/22 (units —10 cm) | 15/12 | 12/22 | 12/15/ 22 | Optimum yield |
|---|---|---|---|---|---|---|---|
| | (units = 10 cm) | | | | | | |
| 0 | | 99.04 | 99.89 | 99.80 | 99.80 | 99.90 | 99.90 |
| 1 | 1636 | 98.51 | 99.81 | 99.73 | 99.79 | 99.85 | 99.85 |
| 2 | −1125 | 98.27 | 99.72 | 99.61 | 99.67 | 99.79 | 99.80 |
| 3 | 1272 | 98.11 | 99.63 | 99.54 | 99.58 | 99.73 | 99.75 |
| 4 | 938 | 97.85 | 99.54 | 99.48 | 99.50 | 99.67 | 99.71 |
| 5 | −1553 | 97.38 | 99.41 | 99.36 | 99.40 | 99.60 | 99.66 |
| 6 | 1817 | 97.29 | 99.27 | 99.23 | 99.27 | 99.54 | 99.61 |
| 7 | 184 | 97.19 | 99.10 | 99.09 | 99.22 | 99.48 | 99.56 |
| 8 | 520 | 96.71 | 98.09 | 98.96 | 99.12 | 99.42 | 99.51 |
| 9 | 1097 | 96.14 | 98.78 | 98.82 | 99.04 | 99.35 | 99.46 |
| 10 | 517 | 96.10 | 98.64 | 98.67 | 98.89 | 99.21 | 99.41 |
| 11 | −939 | 95.71 | 98.47 | 98.54 | 98.74 | 99.12 | 99.37 |
| 12 | 1247 | 95.05 | 98.37 | 98.41 | 98.63 | 99.06 | 99.32 |
| 13 | − 1789 | 94.63 | 98.15 | 98.28 | 98.45 | 98.95 | 99.27 |
| 14 | 281 | 94.16 | 98.04 | 98.22 | 98.30 | 98,87 | 99.22 |
| 15 | 2038 | 93.48 | 97.75 | 98.16 | 98.01 | 98.80 | 99.17 |
| 16 | 966 | 92.79 | 97.39 | 98.13 | 97.81 | 98.74 | 99.12 |
| 17 | 1248 | 92.79 | 97.39 | 97.72 | 97.72 | 98.65 | 99.08 |
| 18 | 2047 | 92.76 | 97.04 | 97.17 | 97.15 | 98.08 | 99.03 |
| 19 | 948 | 92.75 | 96.71 | 96.61 | 96.59 | 97.52 | 98.98 |
| 20 | −165 | 92.33 | 96.51 | 96.47 | 96.59 | 97.42 | 98.94 |

The above table shows the variations of yield and the optinum yield with respect to various combinations of standard or specified sheet lengths, when the belt joint weld marks result from the upper belt loop being 206 m long and the lower belt loop being 208 m long, these being the belts 27 and 27' used for the continuous casting of plastic strip sheet material, as illustrated by FIG. 3. It can be seen that by cutting the different lengths of sheets, a substantial improvement in yield is obtained as composed to cutting only the one 1500 mm length, but that between the different lengths of the sheet length combinations there is not a substantial difference.

Figure 5:
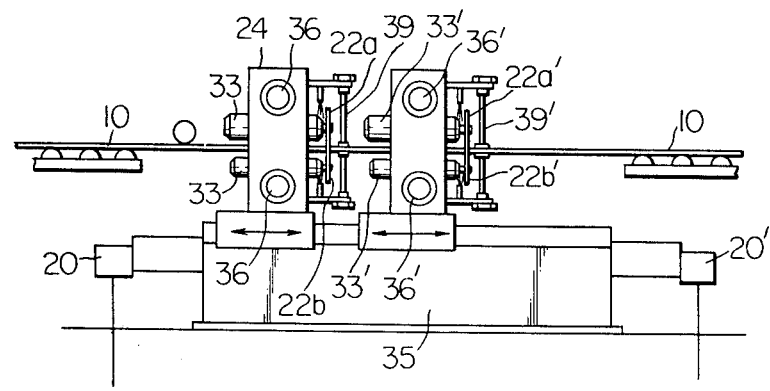
FIG. 5 is an elevational front view of a first type of sheet severing apparatus of a system for severing pieces from a strip of sheet material according to an embodiment of the present invention.
Figure 6:
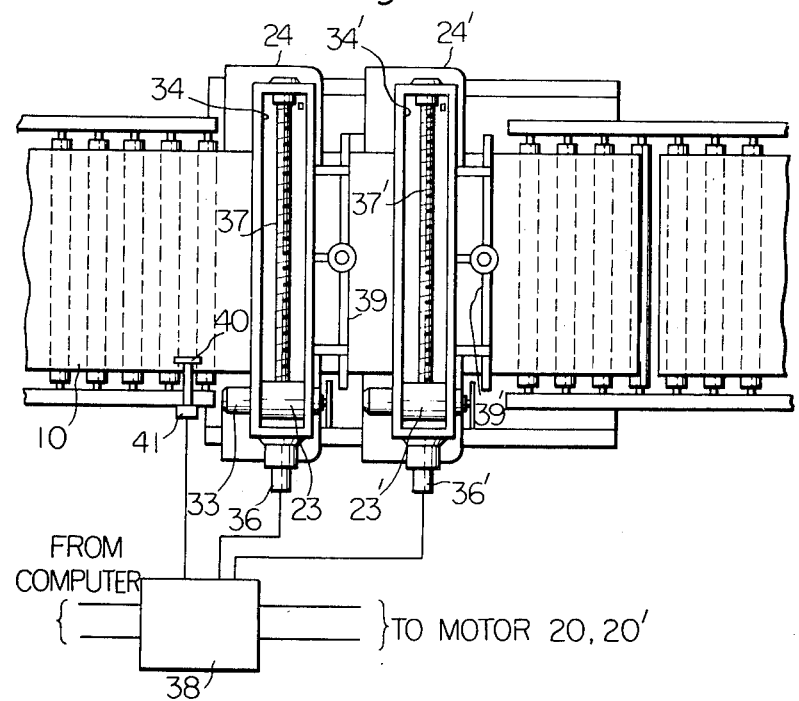
FIG. 6 is a plan view of FIG. 5 with a controller shown diagrammatically.

Now, in connection with the system of FIG. 1 to exemplify a typical embodiment of the present invention, another embodiment is shown by FIGS. 5 and 6, in which the feature is the provision of a second severing apparatus positioned behind the first one and in series therewith to also sever the traveling strip 10. This is explained below.

In this embodiment the first piece of apparatus is of the type comprising a set of upper and lower rotary saws 22a and 22b mounted on the shaft of motors 33 carried by carriages 23 guided by trackways 34 which extend at right angles to the traveling path of the strip 10, which in this instance may be a cast plastic strip having the markings resulting from the belt welds or other imperfections such as air bubbles and in any event requiring severing into commercially required standard lengths of sheets. The trackways 34 are part of a frame 24 which is mounted by a stationary bed 35 on which the frame 24 reciprocates in a direction parallel to the strip's traveling direction. The carriages 23 are driven through the cutting cycle by screw-threaded drive shafts 37 which are in screw-threaded engagement with the carriages 23 and are rotatably synchronously with each other by the previously described type of electro-hydraulic pulse motors 36 which may both be fed by the controller 38. Clamps 39 steady the sheet 10 while the set of saws 22a and 22b is driven through its cutting stroke. Reciprocation of the frame 24 is effected also via electro-hydraulic pulse motor 20 through a screw drive (not shown).

In general, the operation is such that when the strip is to be severed the motors 36 and 20 are controlled, as by the system 38, so that the frame 24 travels with the strip 10 at the latter's traveling speed while the motors 36 through the drive shafts 37 move the carriage 23 through its cutting cycle, the saws 22a and 22b separating (by means not shown) to clear the work during the return stroke. The clamps 39 automatically clamp the sheet during the cutting stoke of the saws 22a and 22b and release during the return stroke of these cutting saws. The strip may be supported in any suitable manner as by roller tables suggestively illustrated and which are reciprocative as required to provide clearance for the reciprocating motion of the frame 24. An improved strip support arrangement is described hereinafter.

The minimum length of the piece that can be cut from the strip 10 with this apparatus is fixed by the length of time required for the frame 24 to go completely through its cycle, as this time is related to the traveling speed of the strip 10. Also, the time required for the return stroke of the carriage 23 is fixed by practical return drive's available. Once the cutters 22a and 22b start their cut, another cut cannot be made by the apparatus until the completion of the cycle. This limits the minimum possible length that can be cut from the strip.

To overcome this deficiency, a second strip-cutting apparatus is positioned behind the one just described. All of the parts are similar and have been assigned corresponding numerals separately identified by the prime mark "'".

When the lengths to be cut from the strip of traveling cast plastic 10 are long enough to be within the capacity of one of the saws, the saw 24 alone may be used in its normal fashion. The length measuring device represented by the wheel 40 which engaged the strip, driving the pulse transmitter 41 which transmits measuring pulses to the controller 38, provides for properly synchronized operation of the pulse motors 20 and 20', moving the frame 24 at the traveling speed of the work with the frame 24' moving to provide clearance for the movement of the frame 24, if necessary. At the proper times the pulse motors 36 are activated so that the saws 22a and 22b traverse the strip and make the cut at right angles to the strip, gears (not shown) then being shifted so that continued operation returns the two frames 24 and 24' with the carriages 23 making their return stroke, the clamps 39 clamping and unclamping as required. Alternately, the frame 24' can be moved initially to provide clearance for recirpocation of the frame 24 and permit it to return.

Also, operation of both of the sawing apparatuses can be effected simultaneously under the control of the controller 38 so that pieces are cut having lengths equaling the interspacing of the saws 22a and 22b, and 22a' and 22b'.

However, each of the frames 24 and 24' and the equipment they carry can be operated entirely independently of the other. Great flexibility in the operation of the apparatus, as a whole, is possible, regardless of the time required for each to go completely through its sawing cycle.

This flexibility is of particular importance when a belt weld marking, such as previously discribed and representing a sheet defect, must be removed with the minimum possible amount of wasted material. In such an instance the apparatus is fixed so that the frame 24' is moved far enough to the right to provide room for the frame 24 to reciprocate on the case 35 with the strip, while the motors 36 make the first cut just in advance of the faulty section. The cut end then travels to this second a apparatus behind the first and at the proper time, the motor 20' is actuated so that the frame 24' travels with the strip while its motors 36' are activated so that its saws 22a' and 22b' make the cut behind the faulty section. This second cut may be made at any distance relative to the first cut so that an extremely short piece may be cut from the strip 10. While the frame 24' is moving with the strip and cutting through its cutting stroke, the frame 24 may be returned to its extreme left-hand position where it is ready for another cut. Therefore, if another faulty section of the strip 10 comes along, the first of the apparatuses is ready for immediate operation, going through its full cycle of operation with the frame 24' of the second apparatus being returned so that it is ready for another cut.

It is to be understood that the principles of the present embodiment are applicable to any cutting apparatus using a cutter. For example, a diamond cutter for glass, contrasting with saws for plastic, plywood, and other products requiring sawing, can be constructed so that the cutter follows a diagonal path having an angularity which in conjunction with correct cutter traveling speed, produces the result that the cutter travels with the strip at the same speed as the latter while traversing the width of the strip, the cutter then requiring to be turned to its starting position to make another cut. In all such instance, the cutter must go through a full cycle, comprising the cutting stroke and the return stroke, before it can make a succeeding cut. After the start of the cycle, the strip continues to travel onwardly both during the cutting and return strokes, which with only one cutting apparatus undesirably limits the minimum length of piece that can be severed from the traveling strip.

The above objectionable feature is advantageously overcome by positioning the second cutting apparatus behind the first. If the cutters of each apparatus are interspaced in the lengthwise direction of the traveling strip, a distance less than the length of the piece that can be cut with only one of the apparatuses, simultaneous operation of the two permits the severing of a piece from the traveling strip which is shorter than either apparatus could provide if operated alone.

The removal of belt weld marks from the continuously cast strip 10 of the application of the embodiment illustrated by FIGS. 5 and 6, is of particular importance because such belt markings may represent marked plastic strip sections, or defects, which are extremely short in length. In this instance with the controller 38 automatically operating, or by adroit manual control of the motors, the cutter reciprocating means comprising the traveling frame and the traveling carriages 23 or 23', are operated sequentially through the cutting cycle of each, with the operation of the second apparatus being started prior to the first one completing its cycle, if necessary. This is preferably done by the controller 38, receiving its signal via a detector used in the inspection process, causing the cutter reciprocating means 24' and 23' of the second or right-hand apparatus shon by FIGS. 5 and 6, to start its cycle while the corresponding cutter reciprocating means of the first or left-hand apparatus is still going through its cycle. On other words, the second apparatus behind the first can start its cut while the first apparatus is still in the return stroke of its cycle, for exmple. Therefore, when an inspector has applied markings in front of and behind the defects such as made by a belt weld, with the detector picking up a signal and sending it to the controller 38, the cycle of the second or right-hand cutter reciprocating means 24' and 23' may be started at a time severing from the strip, just cut by the first apparatus, a piece having the length predetermined by the markings on the length of the strip approaching the system comprising the two saw apparatuses.

Of course, if the controller 38 is connected to a computer as shown in FIG. 1, this embodiment of FIGS. 5 and 6 may operate on the basis of the principles as explained with reference to FIGS. 2 through 4.

The details of the elements of the system of this invention have not been disclosed specifically because they are obtainable commercially. In the case of the system when controlled as described in connection with FIG. 1, but using the cutting means of FIGS. 5 and 6, the following data is applicable:

Examples of the main units and elements of the apparatus:

i. Sheet cut applied: acrylic resin sheet having a thickness of 1.5 to 6 mm and a width of 1400 mm; the travel rate being 3 m/min;

ii. Cutter: Dia Saw of a diameter of 300 mm manufactured by Shoda Tekko K. K;
   the rotational frequency being 3600 rpm. the forwarding rate being 15 m/min;

iii. Oil pressure pulse motor: model 3-SSS manufactured by Fujitsu K. K.;

iv. Control system: pulse motor control device, Fanuc 613K, manufactured by Fujitsu K. K.; pulse counter, PP-6D, or the like manufactured by Ono Sokki K. K.; electronic computer, Melcom 350-5 manufactured by Mitsubishi Denki;

v. Cutter distance: 500 mm vi. Cutting cycle: 10 seconds (time for cutting only and no return being 6 seconds)

Figure 7:
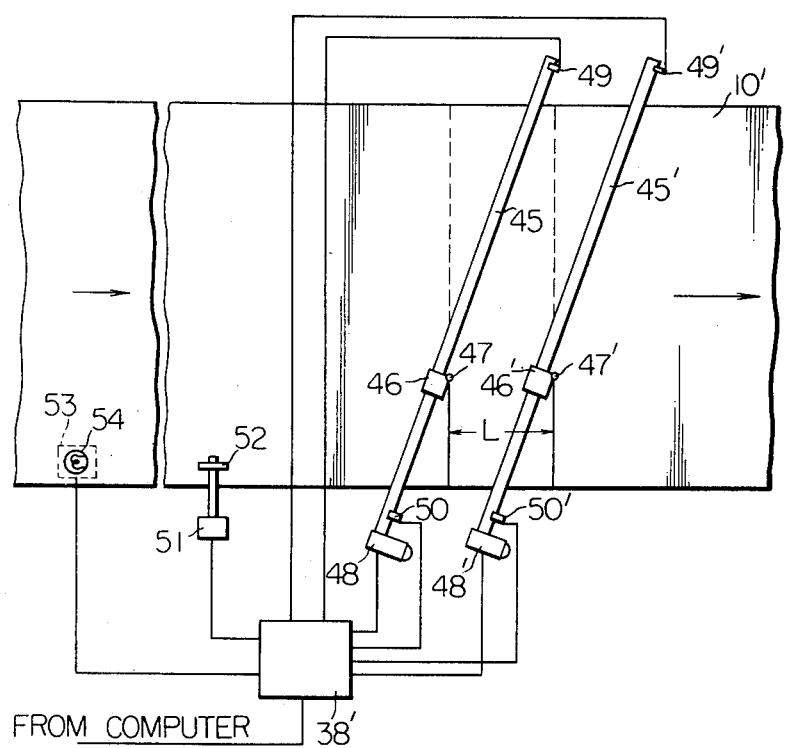
FIG. 7 is a plan view, schematically showing the first and second sheet severing apparatuses of a second type, with their controller represented diagrammatically.

FIG. 7 shows a further embodiment of the present invention which is suitable for the case where the sheet material is glass sheet.

In FIG. 7 a continuously traveling glass strip 10' is shown as passing under a track 45 of the first apparatus of the system. A carriage 46 mounting a diamond cutter 47, is reciprocatively supported by the track 45, being driven through the described cycle by a motor 48 through the medium of either a sprocket chain and sprocket wheel drive system, or by the carriage being in screw-threaded engagement with a screw-threaded drive s shaft or the like, the actual drive mechanism not being shown because it may be conventional. When the motor 48 is actuated, the carriage 46 rides along the track 45 until it actuates a limit switch 49, whereupon the drive reverses and brings the carriage through the return stroke of the cycle to a position of rest established by the carriage 46 actuating a return limit switch 50.

The agnularity of the track 45 is fixed, the apparatus being stationary, and the track extends diagonally for the full width of the strip 10' The motor 48 may be a previously mentioned electrohydraulic pulse motor, and is represented here as pulse fed via a digital controller 38' fed with digital pulses by a pulse transmitter 51 driven by a roller 52 engaging the traveling glass sheet 10'. The controller 38' is also fed with diverse control signals by a computer as shown in the system of FIG. 1. The arrangement is such that the carriage 46 with its diamond cutter 47 is driven at a speed causing the cutter to sever the traveling strip 10' right angularly, the carriage eventually actuating the limit switch 49 which via the control system 37' reverses the drive of the carriage and returns the latter until it actuates the return limit switch 50 whereupon the carriage comes to rest. With the motor 48 of the type referred to, reversal may be effected by shifting a reversing gear train (not shown); if the motor 48 is reversing, it may be reversed.

The minimum length of the piece that can be cut from the strip 10' with this apparatus is fixed by the length of time required for the carriage 47 to go completely through its cycle, as this time is related to the traveling speed of the strip 10'. The speed of the cutting stroke is fixed by the relationship between the angularity of the track 45 relative to the traveling speed of the strip 10', and the time required for the return stroke of the carriage 46 and the diamond cutter 47 is fixed by the limitations of mechanical design consideration. Once the cutter 47 starts its cut, another cut cannot be made by the apparatus until the completion of the cycle. Therefore, the previously described problem occurs.

However, a second glass strip-cutting apparatus positioned behind the one just described solved the problem. All of the parts are similar and have been assigned corresponding numerals separately identified by the prime mark "'". The motor 48' of said second cutting apparatus is also controlled via the controller 38' with the traveling speed of its carriage 46' synchronized relative to the traveling speed of the glass sheet 10', through the pulse transmitter 51 which feeds the controller 38'.

The distance "L" between the cutters in the lenghtwise direction of the traveling strip 10' is made less than the minimum length of piece that can be severed from the strip by either of the apparatuses alone.

Each apparatus is operable through its cutting cycle independently with respect to the other. If under the control of the controller 38' actuated by the pulses from the pulse transmitter 51, the two are operated simultaneously, the minimum length of the piece that can be cut is "L", the interspacing between the cutters 47 and 47'. This length is shorter than the minimum distance between cuts that either apparatus can make along by two immediate sequential cuts.

However, it is important to note that if the motor 48 is actuated, after the initial cut of the cutter 47, with the cutter 47' being at its starting position, that as soon as the cut end of the advancing strip 10' reaches the cutter 47', its motor 48' may be actuated to start its cut, the result being that an extremely small piece may be severed as, for example, to remove an imperfection in the strip 10', of small length in the strip's traveling direction. The controller 38' is shown as being fed with a signal from a detector 53 which may be of the light-responsive type located below the strip 10' and actuated by a light 54 located above the strip 10'. If the strip 10' is not transparent, any other of the known types of signal pickups from traveling strip may be used. With the controller 38' properly connected with a computer, an inspector may mark the leading and trailing portions of a defective part of the strip 10', thus defining a predetermined length, the markings being picked off by the detector 53 and as a signal fed to the controller 38' where it is digested and stored until that portion of the strip reaches the first piece of apparatus which is then automatically actuated so that its cutter 47 severs the strip at the leading mark, the trailing mark serving to actuate the second piece of apparatus with its cutter 47' then serving the strip along the trailing one of the inspector's marks.

Now, an improvement according to the present invention, which is to be applied to the sheet severing systems heretofore described, is explained with reference to FIG. 8 which schematically shows a severing system improved from the system of FIGS. 5 and 6.

Generally, conveying means, such as roller conveyors are employed for conveying the sheet material from its production stage to its severing stage, and for conveying the strip pieces of the sheet material after severing. In FIG. 8, the roller conveyors 61 and 62 are respectively arranged at the upstream and downstream portions of the sheet severing apparatuses with respect to the sheet's traveling direction. The trailing end of the conveyor 61 arranged at the upstream portion reaches to a location adjacent to the upstream end of the sheet severing apparatuses, while the leading end of the conveyer 62 arranged at the downstream portion, reaches to a location adjacent to the downstream end of the sheet severing apparatuses.

With the reciprocative movements of individual frames 24, 24', in the direction parallel to the sheet's traveling direction are conducted, the distance between both sheet severing apparatuses, or the distance between the sheet severing apparatus and the conveyer 61 or the conveyer 62 is naturally changed. That is to say, spaces where no conveying means are provided for the traveling sheet material 10, are formed between both sheet severing apparatuses or between the conveyor 61 or the conveyer 62 and the adjacent severing apparatus. This fact might cause failure in continuation of traveling of the sheet material and thus, the sheet material might fall on the floor. As a result, accurate severing of the sheet material 10 becomes impossible. Accordingly, it is necessary to provide a conveying mechanism which is arranged so as to form a supporting passageway between each sheet severing apparatus and the adjacent severing apparatus and the adjacent conveyer 61 or 62, in a manner such that the traveling sheet material can be smoothly conveyed by the conveying mechanism over the entire spaces, if the above-described distances are changed, as they are by the operation of the apparatus of FIGS. 5 and 6, for example.

In an improvement according to the present invention, such conveying mechanisms forming a supporting passageway for the traveling strip, are advantageously arranged in the system for severing the traveling strip of the sheet material. Reference numerals 63, 70 and 79 illustrate, respectively, such conveying mechanisms arranged between the conveyer 61 and the upstream sheet severing apparatus, between the upstream and downstream severing apparatuses, and between the downstream severing apparatus and the conveyer 62.

The conveying mechanism 63 will now be explained in detail. Rollers 64 and 65 of the mechanism 63 are journaled by bearings fixed to the conveyer 61, while roller 66, 67 and 68 are so arranged that they can be moved together with an upstream severing apparatus when the severing apparatus reciprocates in the direction parallel to the sheet's traveling direction. In this case these rollers 66, 67 and 68 can be journaled by bearing fixed to the frame 24. A flexible endless belt 69 is composed of a cloth, a cloth-incorporated rubber or a synthetic resin or fiber such as nylon. This endless belt 69 may be composed of one belt or a plurality of transversely interspaced belts. An appropriate tension is applied to the belt 69 by rollers 64, 65, 66, 67 and 68, and the belt 69 is driven by driving one of said rollers so that the speed of the belt 69 is equal to the traveling speed of the sheet material 10. This drive is not shown since it may be effected by many known arrangements. In this manner, the conveying mechanism arranged between the upstream severing apparatus and the conveyer 61, enables the sheet to be smoothly moved at the speed exactly equal to the conveying rate of the sheet by the conveyor 61, without fear of the sheet falling on the floor. That is, the sheet can reach the position where it is severed by a set of saws 22a and 22b. Further, in the movement of the upstream severing apparatus, each of rollers 66, 67 and 68 is moved as one part with the upstream severing apparatus, and the other rollers 64 and 65 are stationarily positioned so as to be rotatable. Therefore, though the distance between rollers 64 and 68 and the distance between rollers 65 and 66 are changed, since expansion of the distance between rollers 65 and 66 corresponds to shortening of the distance between rollers 64 and 68 (the reverse charge should naturally occur upon returning of the upstream severing apparatus), the entire length of the belt 69 can always be kept constant. Accordingly, the belt 69 is always spread under the same tension and the sheet is always supported by the conveying mechanism 63 and prevented from falling on the floor. Further, as the belt 69 is driven so that its conveying speed is rendered equal to the speed of the conveyer 61, hardly any slip is caused between the sheet and the belt. Thus, the sheet can be carried by the conveying mechanism 63 quite smoothly and without being damaged.

The conveying mechanism 70 has the same fundamental construction as the mechanism 63 and connects both upstream and downstream sheet severing apparatuses. Therefore, the sheet material 10 can be conveyed by the conveying mechanism 70 from the upstream severing apparatus to the downstream severing apparatus without falling on the floor between the two severing apparatuses.

In the conveying mechanism 70, rollers 71 and 72 are moved synchronously with the frame 24 of the upstream sheet severing apparatus, and rollers 76, 77 and 78 are moved synchronously with the frame 24' of the downstream sheet severing apparatus. The other rollers 73, 74 and 75 are rotatable at their respective fixed positions. The mechanism 70 is also provided with an appropriate belt driving means. Further, the conveying mechanism 79 also can convey the sheet material from the downstream sheet severing apparatus to adjacent conveyer 62 disposed behind the downstream sheet severing apparatus.

In the conveying mechanism 79 rollers 80, 81 and 82 are associated with the frame 24', of the downstream sheet severing apparatus so as to be moved synchronously with the severing apparatus, while the other rollers 83 and 84 are associated with the conveyer 62.

Figure 8:
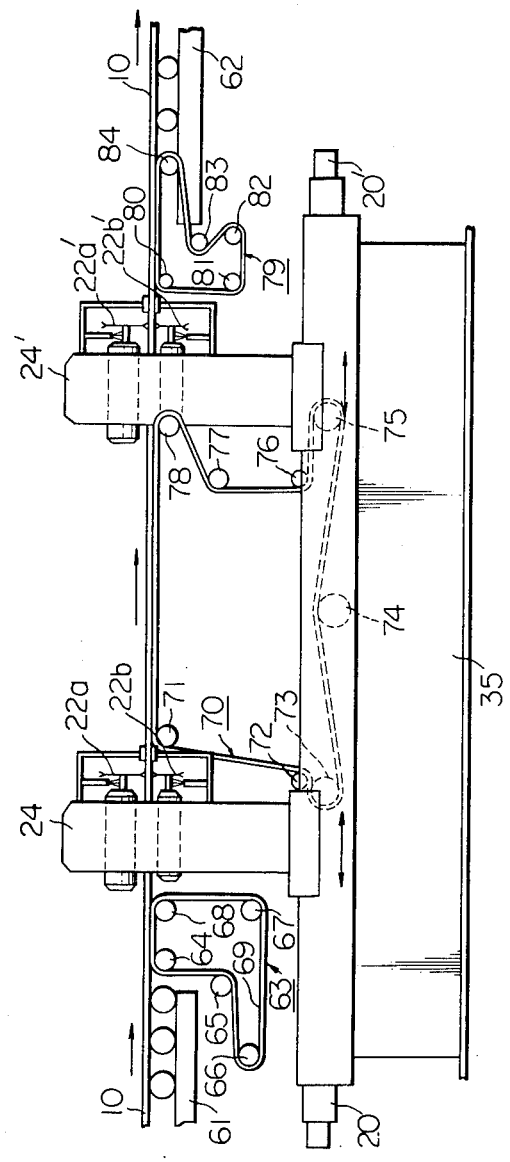
FIG. 8 is an elevational front view showing a system which is a modification of the system of FIGS. 5 and 6.

In FIG. 8, three conveying mechanism 63, 70 and 79 are arranged; however, in the case where the strip of the sheet material 10 is continuously fed from the sheet material production machine, the conveying mechanism 63 can be eliminated, since any preliminarily severed end of the sheet material does not come to the upstream sheet severing apparatus and therefore, there is no risk of falling of the sheet material on the floor occurring.

Further improvement of a system for severing the traveling sheet material according to the present invention is hereinafter explained with reference to FIGS. 9 and 10.

Generally, in the system for severing the traveling sheet material as explained in the foregoing, since each severing apparatus is operated automatically and continuously, and the severing frequency is very high, fine scraps and chips of the sheet material such as plastic, are formed by cutting of the saws. These scraps and chips easily intrude into the movable portions of the sheet severing apparatuses such as bearings, with the result that the machine efficiency is extremely lowered in some cases. An attempted was made to remove such scraps and chips by suction by providing a cover enveloping the saw portions and having a structure capable of moving integrally with the saws and also providing a flexible air duct on one end of the cover, said air duct being connected to a vacuum suction duct. However, in order to prevent interference of said saw cover with the sheet at the time of the traverse movement of the saws, it was necessary to form a sufficient clearance between said cover and sheet. Further, sufficient removal of scraps could not be attained by such a contrivance. Still in addition, the severing apparatus generally has a mechanism for clamping the sheet material by a clamp at the time of traverse cutting. However, sometimes the clamping position is a relatively long distance away from the position where the severing is effected by the saws and in the actual operation, a defect such that finely severed end sections of the sheet material are not obtained, is often observed.

With a view to overcoming these defects and making it possible to utilize the transverse severing apparatus effectively on an industrial scale, I have conducted research and have achieved the improvement explained hereinafter.

Figure 9:
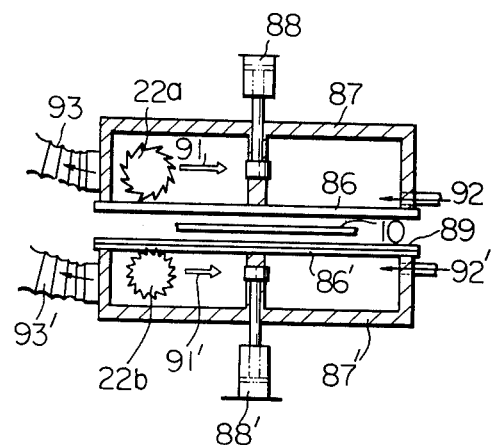
FIGS. 9 and 10 are schematic side and front views, respectively, showing further modifications of a sheet severing system attained by the present invention.
Figure 10:
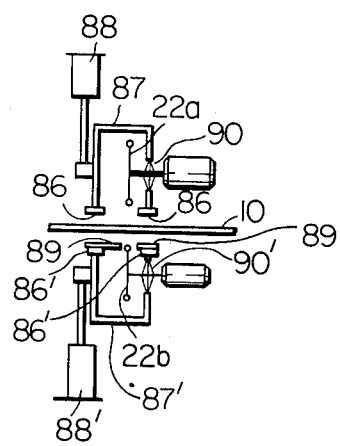

FIG. 9 is a front view illustrating the longitudinal section of a saw cover. FIG. 10 is a longitudinal sectional elevation showing the cover of FIG. 9. Reference numeral 10' indicates the sheet, and reference numerals 22a and 22b indicate a set of upper and lower rotary saws. Clamps 86 and 86' are actuated by air cylinders 88 and 88' to clamp the sheet 10. After completion of this clamping operation, saws 22a and 22b are respectively lowered and elevated to positions suitable for transverse cutting and are forwarded transversely in the direction indicated by a rows 91 and 91' to transversely cut the sheet 10. Covers 87 and 87' are formed so that they have structures integrated with clamps 86 and 86', respectively. Accordingly, after completion of the clamping operation, said covers have no movement relative to the sheet 10 during the transverse movement of the saws and, therefore, there is no fear that the sheet will be damaged by a sliding movement or the like of the strip and the saw cover relative to each other. More specifically, the rotary saws 22a and 22b are lowered, elevated or moved transversely in a long rectangular parallelopiped space formed by the clamps and covers which have a rectangular section. On the face of the cover positioned on the side where the rotary shaft of the saws is forwarded laterally, brushes 90 and 90' are provided to enhance the sealing of said cover and absorb the relative movement between the rotary shafts of the saws and the cover. Scraps or chips can be mostly removed by sucking air at a rate of 10 to 20 m/sec via ducts as indicated by reference numerals 93 and 93'. If a small amount of air is blown from the end opposite the suction end through pipes as indicated by 92 and 92', the floatation of scraps is promoted and the scraps are easily carried away by the sucked air current, whereby collection of scraps can be greatly enhanced.

Further, by providing a support 89 for supporting the lower surface of the sheet 10, the downward movement of the sheet is inhibited at the time of transverse cutting and, therefore, a finely cut section can be obtained from the sheet. For instance, when a suitable material, such as a surface-smoothed aluminum plate or plastic plate, is chosen as the material constituting the support 89, it is possible to construct a fixed apparatus. in which elevating and lowering movements of the clamps and covers positioned below the sheet which are indicated by 86', 87', 88' and 89, are not conducted and the highest point of the support 89 is positioned at the same level as that of the lower surface of the sheet.

When the above illustrated structure of this improvement is applied to the sheet severing apparatus previously described, scraps formed at the time of transverse cutting of a sheet can be advantageously removed and the surface of the sheet is not damaged by the cutting operation. Still further, conditions of the cut section of the sheet can be greatly improved. Thus, with this improvement, it is possible to employ a sheet severing apparatus including rotary saws effectively on an industrial scale.

It should be noted that when the cutter of the sheet severing apparatus is composed of a pressurized water jet or laser ray (not shown), the above described covers 87 amd 87' can be used for preventing the water jet from spraying and for protecting an operator from the laser ray.

What is claimed is:

1. A method for obtaining at least two collections of sheets respectively of relatively longer and shorter lengths, by transversely severing a polymerized and continuously traveling plastic strip which leaves one end of a polymerizing interspace defined by confronting belt working lengths of a pair of upper and lower endless belts having specified weld lines and known defects formed on the surface of said upper and lower belts, said belts being disposed to run continuously at the same speed in the same direction, the other end of the polymerizing interspace being continuously fed with an unhardened plastic raw material to be polymerized at an appropriate temperature condition, said plastic strip having usable longitudinally extending portions from which a plurality of sheets of either of said longer and shorter lengths may be severed, said portions being such terminated at least at one end by one of a plurality of defects including a first group of defects which occur, according to expectation, in the polymerized plastic sheet due to the cause of said weld lines and known defects of said endless belts, and a second group of defects which occur, contrary to expectation, in the polymerized plastic sheet during polymerizing said plastic sheet due to diverse known causes, wherein the improvement comprises:

passing said traveling plastic strip through a first pickup means for successively detecting occurrence of said first group of defects, and through a second pickup means for successively detecting occurrence of said second group of defects of said polymerized plastic strip;

obtaining position information on each of said second group of defects in the traveling direction of said plastic strip, relative to position information of an adjacent one of said first group of defects having occurred due to said weld lines and known defects of said upper and lower endless belts;

determining successively the lengths of successive portions of said usable portions on the basis of the obtained position information of said first and second groups of said defects in said polymerized plastic strip;

calculating a ratio of number of sheet pieces of said longer and shorter lengths for obtaining an entire combined length which is closest to but shorter than the length of each said usable portion, and;

severing each of said usable portions into the longer and shorter lengths in accordance with the calculated numbers ratio.

* * * * *

UNITED STATES PATENT AND TRADEMARK OFFICE
CERTIFICATE OF CORRECTION

PATENT NO. : 4,044,639
DATED : August 30, 1977
INVENTOR(S) : Tetsuji Kato

It is certified that error appears in the above-identified patent and that said Letters Patent are hereby corrected as shown below:

In the Specification:

Col. 4, line 22 - change "preferably" to --preferable--.

Col. 5, line 32 - change "tranversely" to --transversely--.

Col. 6, line 8 - change "serving" to --severing--.

Col. 6, line 23 - before "traveling" insert --the--.

Col. 6, line 42 - delete "the" between "of" and "counters".

Col. 6, line 60 - delete "portion is" and insert --numbers--.

Col. 7, line 3 - insert a space between "portion" and "is".

Col. 9, line 1 - between "value" and "1" insert --of--.

Col. 10, line 52 - change "caes" to --cases--.

Col. 11, line 38 - change "composed" to --compared--.

Col. 11, line 63 - change "rotatably" to --rotated--.

Col. 12, line 40 - change "out" to --cut--.

Col. 14, line 24 - correct spelling of "example".

Col. 15, line 56 - correct spelling of "length".

Col. 16, line 25 - change "serving" to --severing--.

UNITED STATES PATENT AND TRADEMARK OFFICE
CERTIFICATE OF CORRECTION

PATENT NO. : 4,044,639

DATED : August 30, 1977

INVENTOR(S) : Tetsuji Kato

It is certified that error appears in the above-identified patent and that said Letters Patent are hereby corrected as shown below:

Col. 18, line 44 - change "Further" to --Furthermore--.

Col. 19, line 33 - delete "." after "apparatus".

In the Claim:

Col. 20, line 19 - change "such" to --each--.

Col. 20, line 46 - change "number" to --numbers--.

Signed and Sealed this

Twentieth Day of December 1977

[SEAL]

Attest:

RUTH C. MASON
Attesting Officer

LUTRELLE F. PARKER
Acting Commissioner of Patents and Trademarks